United States Patent

Becker et al.

[11] 3,902,318
[45] Sept. 2, 1975

[54] POWER TRANSMISSION

[75] Inventors: Kenneth F. Becker, Clarkston; Raymond P. Lambeck, Bloomfield Hills; Nicholas F. Pedersen, Farmington, all of Mich.

[73] Assignee: Sperry Rand Corporation, Troy, Mich.

[22] Filed: Aug. 28, 1974

[21] Appl. No.: 501,311

[52] U.S. Cl. ............... 60/388; 60/391; 60/444; 60/488; 60/DIG. 10; 60/456
[51] Int. Cl. .................. F15b 9/04; F15b 21/08
[58] Field of Search .......... 60/388, 391, 444, 456, 60/464, 465, 477, 488, DIG. 2, DIG. 5, DIG. 10

[56] References Cited
UNITED STATES PATENTS

| | | | |
|---|---|---|---|
| 2,276,591 | 3/1942 | Ray | 60/DIG. 2 |
| 2,631,431 | 3/1953 | Grebe | 60/477 |
| 2,643,555 | 6/1953 | Steibel | 60/DIG. 2 |
| 2,942,581 | 6/1960 | Gaffney | 60/388 |

*Primary Examiner*—Edgar W. Geoghegan
*Attorney, Agent, or Firm*—Theodore Van Meter

[57] ABSTRACT

An integrated electro hydraulic actuator package for remotely controlling the position of an aircraft control surface has both its input power and its input command signals supplied solely by wires from remote locations. The package encloses an electric motor running wet in the hydraulic fluid and driving a reversible variable displacement pump connected directly to a differential piston and cylinder actuator and is designed to be completely manifolded. A differential piston and cylinder reservoir carries fluid to make up for any losses of fluid from the actuator to the outside of the package. An auxiliary pump supplies fluid to a servo motor circuit for control purposes, the circuit being governed by an electro-hydraulic servo valve whereby a servo motor system adjusts the displacement of the main pump. Loss of fluid from the package or mechanical failure in a pump causes loss of delivery pressure at the auxiliary pump and actuates a bypass valve to bypass the actuator allowing make-up of fluid from the reservoir. Overload protection is provided in the servo motor circuit by a pair of pressure responsive dumping valves. A linearly variable differential transformer provides a signal indicating the position of the actuator which is combined with a command signal from a remote location to govern the electro-hydraulic servo valve. The position of the displacement adjuster of the main pump is also fed to the electro-hydraulic servo valve providing a signal indicative of the velocity of the actuator. A heat exchanger surrounds the electric motor and carries the fluid returning from the pump housing to the reservoir. An auxiliary electric motor driven fan cools the heat exchanger.

8 Claims, 1 Drawing Figure

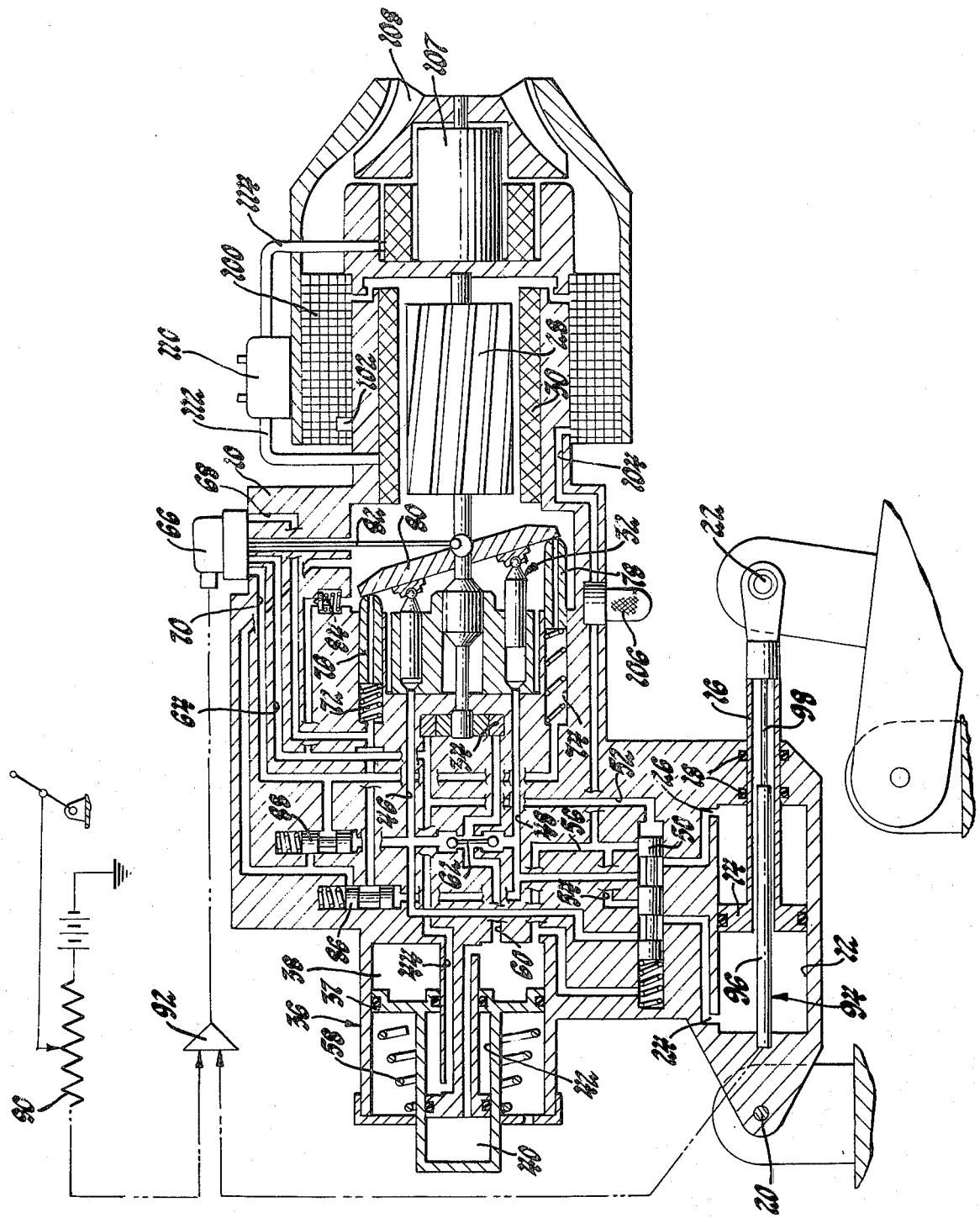

POWER TRANSMISSION

In the operation of large aircraft, it is necessary to provide power amplification at the aircraft control surfaces of the commanding input motions provided by either the pilot in manual flight or by an automatic pilot. Commonly such systems have comprised one or more central hydraulic systems with an engine driven pump supplying high pressure fluid through long conduits to one or more hydraulic actuators at the control surfaces. Follow-up control is usually provided by an electrical summing circuit controlling an electro-hydraulic servo valve which in turn controls the supply of fluid to the actuator. Some of the drawbacks of such systems are the weight of the long hydraulic lines in large aircraft and the vulnerability of such systems to failure in the event of accidental disruption of a hydraulic line.

The present invention is aimed at overcoming these disadvantages by the provision of an integrated actuator package, one or more of which can be located at the necessary control surfaces and which can be supplied with power and with controlling signals through electric wires only. That is to say, it is what is termed a fly-by-wire and a power-by-wire system. The invention aims to provide a package which will operate at high efficiency and will combine in one unitary envelope a linear actuator driven by a reversible variable displacement pump driven by a wet running electric motor together with an auxiliary pump, reservoir, control valve, and servomotor with all necessary auxiliary controls to assure efficient operation and long life.

These objects are achieved by the provision of an integrated actuator package comprising a hydraulic actuator, a rotary electric prime mover, a reversible variable displacement hydraulic pump driven by the prime mover and driving the actuator, an auxiliary pump also driven by the prime mover, a servo motor connected to regulate the displacement of the first pump and supplied with fluid by the second pump, an electro-hydraulic servo valve controlling the supply of fluid to the servo motor, a closed expansible chamber reservoir, means connecting the reservoir to the intake of both pumps, and a unitary housing enclosing all of the foregoing components with the prime mover running in the fluid handled by the pumps, whereby the supply of electric power to the prime mover and of an electric error signal to the servo valve will produce solely through electric conductors a powered amplification of a command signal originating at a remote location.

IN THE DRAWING

The single FIGURE represents a diagrammatic view of an integrated actuator package incorporating a preferred form of the present invention.

In the drawing, the housing 10 represents diagrammatically an enclosing housing of any suitable configuration which totally encloses the necessary power and control elements of the actuator as a whole, with the only elements moving through the wall of the package being the output member of the actuator and a movable member of the reservoir, both of which are provided with sliding seals. The actuator comprises a cylinder 12 having a differential piston 14 with its piston rod 16 slidable therein and extending through the wall with the slidable seals 18. The housing 10 may be pivotally secured to the air frame as at 20, and the piston rod 16 may be connected to the actuating arm of an aircraft control surface as at 22. The actuator is moved by admitting and exhausting hydraulic fluid to and from the conduits 24 and 26. An electric motor prime mover 28 having a stator 30 runs in a body of hydraulic fluid within the housing 10 and is connected to drive mechanically a reversible variable displacement piston pump 32 and an auxiliary pump 34 which supplies fluid for control purposes. A reservoir 36 has a slidable differential piston 37 therein which separates the reservoir provided by the two chambers 38 and 40 from the atmosphere and from a pressurizing chamber 42 which is connected through conduit 44 to the outlet of the auxiliary pump 34.

The main pump 32 is connected by conduits 46 and 48 to the conduits 24 and 26 of the actuator cylinder 12 for supplying fluid to one end or the other thereof as determined by the displacement setting of the pump 32. A bypass valve 50 is spring loaded to the right and pressure operated to the left by fluid from the auxiliary pump by means of a conduit 52. In the normal position as illustrated, the valve 50 closes a bypass conduit 54 and a reservior conduit 56 from access to the actuator cylinder 12.

In the event of leakage from the system at the seals 18 or elsewhere resulting in starvation of the auxiliary pump 34 at its inlet conduit 60, or if for any other reason its output pressure falls, this will allow the bypass valve 50 to shift to the right opening the bypass 54 and the reservoir conduit 56 so that make up fluid can be delivered to the actuator and its associated passages. This restores pressure to the auxiliary pump and again closes the bypass valve 50. If this does not occur for any reason, then the bypass 54 remains open to allow the load to float. An auxiliary spring 58 may be provided to bias the piston 37 to the right in the event of total loss of auxiliary pump pressure. A shuttle valve 62 provides access for reservoir replenishing through conduit 60 to whichever one of the main conduits 46 or 48 is at a lower pressure than the other at any time.

The auxiliary pump 34 also supplies control fluid through a conduit 64 to an electro hydraulic servo valve 66. The valve 66 delivers this fluid at modulated pressures to a pair of servo motor circuits 68 and 70 which lead to a pair of servo cylinders 72 and 74 controlling a pair of pistons 76 and 78 which control the swash plate or displacement adjusting mechanism 80 of the pump 32. A mechanical connection 82 feeds back the position of the swash plate 80 to the servo valve 66 and introduces a signal there indicative of the velocity of the piston 14. The pistons 76 and 78 are provided with small central lubricating passages to the swash plate but are not large enough to affect the servo motor control by the servo valve 66. A pressure relief valve may be provided as at 84 for limiting the pressure of the auxiliary pump 34.

No relief valves are provided for the main circuit conduits 46 and 48, but instead pressure responsive valves 86 and 88 are provided for bypassing to tank the pressure in lines 68 and 70 whenever the pressure in line 48 or 46 respectively rises above a predetermined value. This causes the pump displacement adjusting mechanism to return to a near zero flow position at the predetermined pressure level. The power input and thus the heat rejection in the package is held to a minimum value commensurate with a stalled load condition.

An electrical command controller indicated at 90 feeds a command signal to an input summer 92 which receives a feedback signal from a linearly variable differential transformer 94 at the output actuator piston 16. This transformer comprises a stator 96, the current in which is varied by a movable input member 98 connected to move with the piston rod 16.

Heat losses in the system may be dissipated by a liquid-to-air heat exchanger 100 which is connected into the auxiliary pump return circuit, receiving fluid from the sump of pump 32 and through the gap of motor 28 and exhausting back to the reservoir through a conduit 102–104 and a filter 106. The heat exchanger is preferably positioned around the stator of the electric motor 28, the heat exchanger 100 being air cooled by means of an electric motor 107 and a fan 108. Other sources of cooling air may be used when available such as ram air in an aircraft while in flight, leaving the motor 107 idle except when on the ground. An electric power terminal 110 supplies the motors 28 and 107 through conductors 112 and 114.

In operation, with electric power being supplied to the input terminal 110 and with command signals being provided by the device 90, the servo valve will regulate the position of the actuator piston 14 to correspond to the position commanded by so adjusting the swash plate 80 through the servo motors 72 and 74 that the main pump 32 delivers just the small amount of fluid to one side or the other of piston 14 which is needed to maintain its position against the resisting load applied to the aircraft control surface or other load at any instant. Should an error develop between the command signal from the controller 90 and the feedback signal from the transformer 94, the summer 92 will provide the appropriate input to the servo valve 66 for correction of that error in the manner well known in servo control systems. At other times, during the many extended periods when no movement of the output actuator is necessary, the power requirements at the pump 32 are minimal.

We claim:

1. An integrated actuator package comprising a hydraulic actuator, a rotary electric prime mover, a reversible variable displacement hydraulic pump driven by the prime mover and driving the actuator, an auxiliary pump also driven by the prime mover, a servo motor connected to regulate the displacement of the first pump and supplied with fluid by the second pump, an electro hydraulic servo valve controlling the supply of fluid to the servo motor, a closed expansible chamber reservoir, means connecting the reservoir to the intake of both pumps, and a unitary housing enclosing all of the foregoing components with the prime mover running in the fluid handled by the pumps, whereby the supply of electric power to the prime mover and of an electric error signal to the servo valve will produce, solely through electric conductors, a powered amplification of a command signal originating at a remote location.

2. An actuator package as defined in claim 1 wherein the actuator has a differential area piston and cylinder and the reservoir is a differential area piston and cylinder biased to pressurize the reservoir by the output pressure of the second pump.

3. An actuator package as defined in claim 2 having a valve spring loaded to connect the auxiliary pump intake to the reservoir and normally closed by auxiliary pump pressure during operation of the package whereby any loss of fluid from the package reduces the auxiliary pump pressure allowing the reservoir to make up the loss through the bypass valve and restore the auxiliary pump pressure.

4. An actuator package as defined in claim 1 having a bypass valve spring loaded to connect the two ends of the actuator cylinder and normally closed by auxiliary pump pressure during operation of the package whereby any loss of fluid from the package reduces the auxiliary pump pressure allowing the valve to bypass the actuator and the load to float.

5. An actuator package as defined in claim 1 wherein the servo valve controls a pressure responsive overload limiting valve connected to dump the servomotor circuit upon attainment of a predetermined limit of pressure in the actuator.

6. An actuator package as defined in claim 1 wherein the servo valve is responsive both to the error between the command signal and the position of the actuator and to the momentary displacement of the first pump.

7. An actuator package as defined in claim 1 wherein the actuator includes a linearly variable differential transformer and the servo valve is responsive both to the error between the command signal and the position of the actuator and to the momentary displacement of the first pump.

8. An actuator package as defined in claim 1 having a heat exchanger surrounding the prime mover and receiving the fluid circulated by the second pump and an independent electric motor driven fan arranged to cool the heat exchanger.

* * * * *